United States Patent
Shoham et al.

(10) Patent No.: US 9,503,396 B2
(45) Date of Patent: Nov. 22, 2016

(54) CELL FORWARDING ORDER SELECTION FOR SENDING PACKETS

(71) Applicants: Doron Shoham, Shoham (IL); John J. Williams, Jr., Pleasanton, CA (US)

(72) Inventors: Doron Shoham, Shoham (IL); John J. Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 14/662,131

(22) Filed: Mar. 18, 2015

(65) Prior Publication Data

US 2016/0277323 A1    Sep. 22, 2016

(51) Int. Cl.
*H04L 12/28* (2006.01)
*H04L 12/935* (2013.01)
*H04L 12/741* (2013.01)
*H04L 12/861* (2013.01)

(52) U.S. Cl.
CPC ......... *H04L 49/3072* (2013.01); *H04L 45/745* (2013.01); *H04L 49/9057* (2013.01)

(58) Field of Classification Search
None
See application file for complete search history.

(56) References Cited

U.S. PATENT DOCUMENTS

| | | | |
|---|---|---|---|
| 6,816,492 B1 | 11/2004 | Turner et al. | |
| 7,525,995 B2 | 4/2009 | Iny | |
| 2008/0008204 A1* | 1/2008 | Yamada | H04L 49/1515 370/412 |
| 2008/0279195 A1* | 11/2008 | Okuno | H04L 49/1523 370/395.6 |
| 2011/0196833 A1* | 8/2011 | Drobychev | G06F 17/30082 707/634 |

* cited by examiner

*Primary Examiner* — Minh-Trang Nguyen
(74) *Attorney, Agent, or Firm* — The Law Office of Kirk D. Williams (57) ABSTRACT

In one embodiment, packets are sent a packet switching mechanism of a packet switching device, which includes partitioning each particular packet into a plurality of cells with each particular packet and cell derived therefrom associated with a same particular timestamp and a same particular ingress point identifier representing an ingress point of a plurality of ingress points of the packet switching mechanism. These cells are sent through the packet switching mechanism by selecting and forwarding, at each of a plurality of points within the packet switching mechanism. A tie-breaking value is determined based on a manipulation of ingress point identifier associated with said identifiable cell in a manner to vary the tie-breaking selection ordering of ingress point identifiers for different timestamp values. The tie-breaking value is used in selecting a next cell to forward when cells are associated with a same timestamp.

20 Claims, 8 Drawing Sheets

CELL FORWARDING ORDER SELECTION FOR SENDING PACKETS

TECHNICAL FIELD

The present disclosure relates generally to the varying the order of forwarding of packets, typically split into cells, within a packet switching device.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, which often uses longest prefix matching of an Internet Protocol (IP) packet's destination address in determining how to forward the IP packet.

Within a packet switching device, a packet is typically split into multiple cells, with each of these cells forwarded through the packet switching device to a destination point. The packet is reassembled and then further processed (e.g., manipulated and/or forwarded). As the resources within a packet switching device are limited, all cells cannot be forwarded through the packet switching device at a same time.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with cell forwarding order selection for sending packets within a packet switching device.

One embodiment includes a method, comprising sending a plurality of packets through a packet switching mechanism of a packet switching device, which includes partitioning each particular packet into a plurality of cells with each particular packet associated with a particular timestamp and a particular ingress point identifier representing an ingress point of a plurality of ingress points of the packet switching mechanism, and with each particular cell of the plurality of cells associated with the particular packet being associated with the particular timestamp and the particular ingress point identifier. In one embodiment, sending the plurality of packets includes sending said cells through the packet switching mechanism by selecting and forwarding, at each of a plurality of points within the packet switching mechanism, cells with an earlier timestamp before cells with a later timestamp, and determining a tie-breaking value for each of a same timestamp plurality of cells having a same timestamp and different ingress point identifiers and using said tie-breaking values to select the order to forward cells of the same timestamp plurality of cells, wherein said determining a tie-breaking value for each identifiable cell of the same timestamp plurality of cells is performed based on a manipulation of ingress point identifier associated with said identifiable cell in a manner to vary the tie-breaking selection ordering of ingress point identifiers for different timestamp values, with the tie-breaking value being different than the ingress point identifier associated with said identifiable cell.

In one embodiment, the manipulation of ingress point identifiers to vary the tie-breaking selection ordering of ingress point identifiers for different timestamp values is performed in a deterministic manner such that for a value of a timestamp and a value of an ingress point identifier a deterministic tie-breaking value is a result.

In one embodiment, the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to limit the amount of jitter induced by changing the tie-breaking selection ordering of ingress point identifiers for different timestamp values.

2. Description

Disclosed are, inter alia, methods, apparatus, computer-storage media, mechanisms, and means associated with cell forwarding order selection for sending packets within a packet switching device. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes a method, comprising sending a plurality of packets through a packet switching mechanism of a packet switching device, which includes partitioning each particular packet into a plurality of cells with each particular packet associated with a particular timestamp and a particular ingress point identifier representing an ingress point of a plurality of ingress points of the packet switching mechanism, and with each particular cell of the plurality of cells associated with the particular packet being associated with the particular timestamp and the particular ingress point identifier. In one embodiment, sending the plurality of packets includes sending said cells through the packet switching mechanism by selecting and forwarding, at each of a plurality of points within the packet switching mechanism, cells with an earlier timestamp before cells with a later timestamp, and determining a tie-breaking value for each of a same timestamp plurality of cells having a same timestamp and different ingress point identifiers and using said tie-breaking values to select the order to forward cells of the same timestamp plurality of cells, wherein said determining a tie-breaking value for each identifiable cell of the same timestamp plurality of cells is performed based on a manipulation of ingress point identifier associated with said identifiable cell in a manner to vary the tie-breaking selection ordering of ingress point identifiers for different timestamp values, with the tie-breaking value being different than the ingress point identifier associated with said identifiable cell.

In one embodiment, the manipulation of ingress point identifiers to vary the tie-breaking selection ordering of ingress point identifiers for different timestamp values is performed in a deterministic manner such that for a value of a timestamp and a value of an ingress point identifier a deterministic tie-breaking value is a result.

In one embodiment, the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to limit the amount of jitter induced by changing the tie-breaking selection ordering of ingress point identifiers for different timestamp values.

One embodiment includes independently calculating for each of the plurality of points within the packet switching mechanism, tie-breaking values for a plurality of cells having a same timestamp and different ingress point identifiers. In one embodiment, said determining a tie-breaking value for each identifiable cell of a same timestamp plurality of cells having a same timestamp and different ingress point identifiers, includes bit manipulation of bits of both the same timestamp and ingress point identifier associated with said identifiable cell. In one embodiment, said bit manipulation includes an X-OR operation on bits of the same timestamp with bits of the ingress point identifier associated with said identifiable cell. In one embodiment, said bit manipulation includes a bit shifting operation on bits of the same timestamp.

In one embodiment, the manipulation of ingress point identifiers to vary the tie-breaking selection ordering of ingress point identifiers for different timestamp values is performed using a deterministic calculation such that for a value of a timestamp and a value of an ingress point identifier deterministic tie-breaking value is a result.

In one embodiment, said deterministic calculation includes bit manipulation of bits of both the same timestamp and ingress point identifier associated with said identifiable cell. In one embodiment, said bit manipulation includes an X-OR operation on bits of the same timestamp with bits of the ingress point identifier associated with said identifiable cell. In one embodiment, said bit manipulation includes a bit shifting operation on bits of the same timestamp.

In one embodiment, said vary the tie-breaking selection ordering of ingress point identifiers for different timestamp values is done in a non-round-robin ordering.

In one embodiment, the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to less than half of the number of ingress points in the plurality of ingress points away from its previous position in the overall ordering. In one embodiment, the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to less than two positions away from its previous position in the overall ordering.

One embodiment includes a packet switching device, comprising: a plurality of interfaces configured to send and receive packets; and a packet switching mechanism, including a plurality of cell-switched buffered stages, configured to packet switch packets among said interfaces. The packet switching device is configured to send a plurality of packets through the packet switching mechanism, which includes configuration to partition each particular packet into a plurality of cells with each particular packet associated with a particular timestamp and a particular ingress point identifier representing an ingress point of a plurality of ingress points of the packet switching mechanism, and with each particular cell of the plurality of cells associated with the particular packet being associated with the particular timestamp and the particular ingress point identifier; wherein said configuration to send the plurality of packets includes configuration to send said cells through the packet switching mechanism by selecting and forwarding cells with an earlier timestamp before cells with a later timestamp, and determining a tie-breaking value for each of a same timestamp plurality of cells having a same timestamp and different ingress point identifiers and using said tie-breaking values to select the order to forward cells of the same timestamp plurality of cells, wherein said determining a tie-breaking value for each identifiable cell of the same timestamp plurality of cells is performed based on a manipulation of ingress point identifier associated with said identifiable cell in a manner to vary the tie-breaking selection ordering of ingress point identifiers for different timestamp values.

In one embodiment, the manipulation of ingress point identifiers to vary the tie-breaking selection ordering of ingress point identifiers for different timestamp values is performed in a deterministic manner such that for a value of a timestamp and a value of an ingress point identifier a deterministic tie-breaking value is a result. One embodiment includes independently calculating for each of the plurality of points within the packet switching mechanism, tie-breaking values for a plurality of cells having a same timestamp and different ingress point identifiers. In one embodiment, the manipulation of ingress point identifiers to vary the tie-breaking selection ordering of ingress point identifiers for different timestamp values is performed using a deterministic calculation such that for a value of a timestamp and a value of an ingress point identifier a deterministic tie-breaking value is a result. In one embodiment, said deterministic calculation includes bit manipulation of bits of both the same timestamp and ingress point identifier associated with said identifiable cell. In one embodiment, the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to limit the amount of jitter induced by changing the tie-breaking selection ordering of ingress point identifiers for different timestamp values.

FIGS. 1A-B, 2A-C and 3 and their discussion herein are intended to provide a description of various exemplary packet switching systems used according to one embodiment.

Figure 1A:
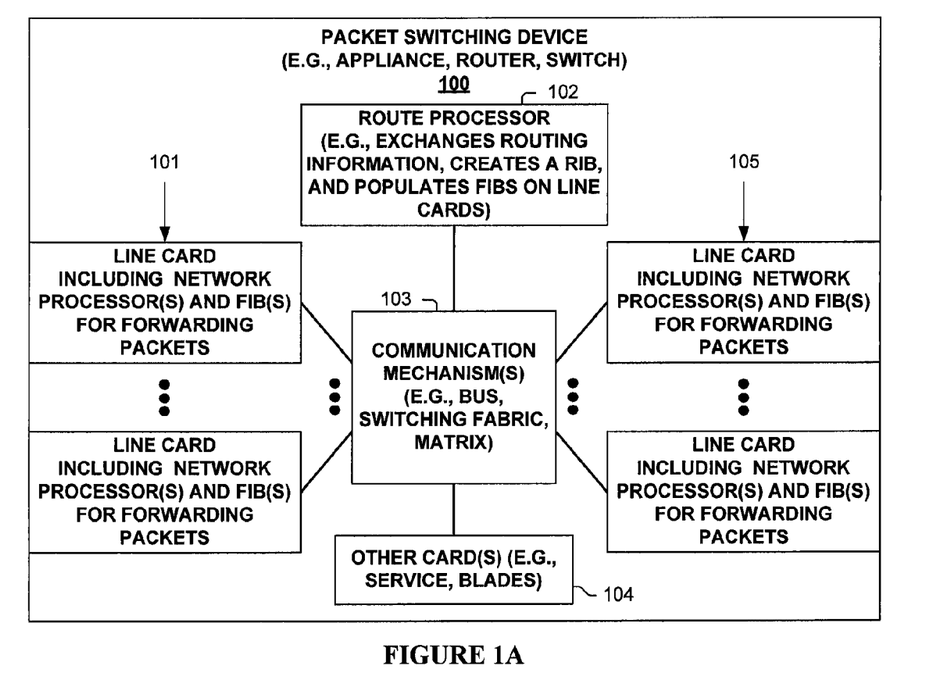
FIG. 1A illustrates a packet switching device according to one embodiment.

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more processing elements that are used in one embodiment associated with cell forwarding order selection for sending packets within a packet switching device. Packet switching device 100 also has a control plane with one or more processing elements 102 for managing the control plane and/or control plane processing of packets associated with cell forwarding order selection for sending packets within a packet switching device. Packet switching device 100 also includes other cards 104 (e.g., service cards, blades) which include processing elements that are used in one embodiment to process packets associated with cell forwarding order selection for sending packets within a packet switching device, and some communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, line cards 101 and/or 105 use a tie-breaking selection ordering of manipulated ingress point identifiers in determining which packets/cells to send before other packets/cells having a same timestamp.

Figure 1B:
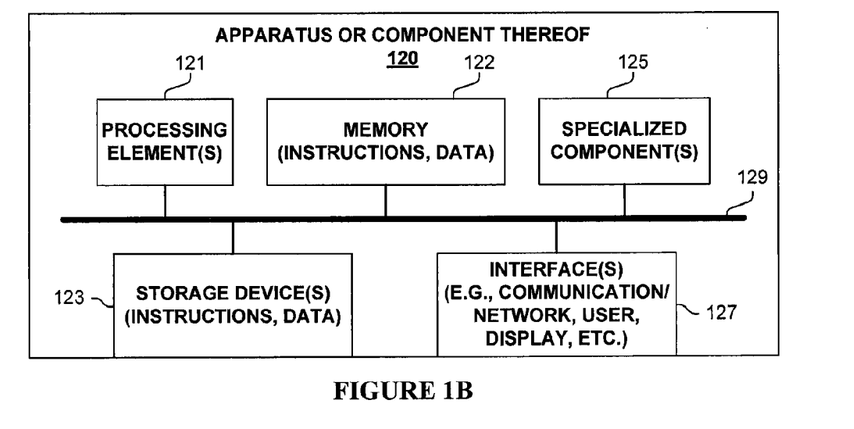
FIG. 1B illustrates an apparatus according to one embodiment.

FIG. 1B is a block diagram of an apparatus 120 used in one embodiment associated with cell forwarding order selection for sending packets within a packet switching device. In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 2A:
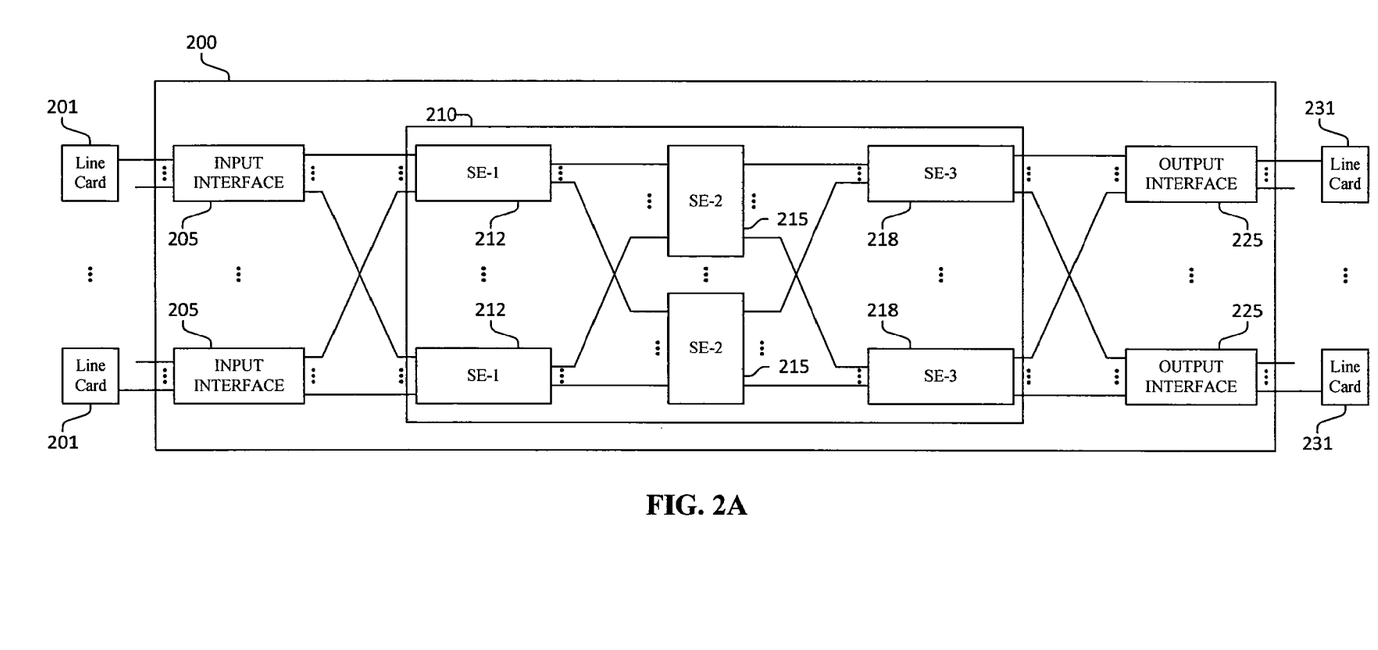
FIG. 2A illustrates a packet switching device according to one embodiment.
Figure 2B:
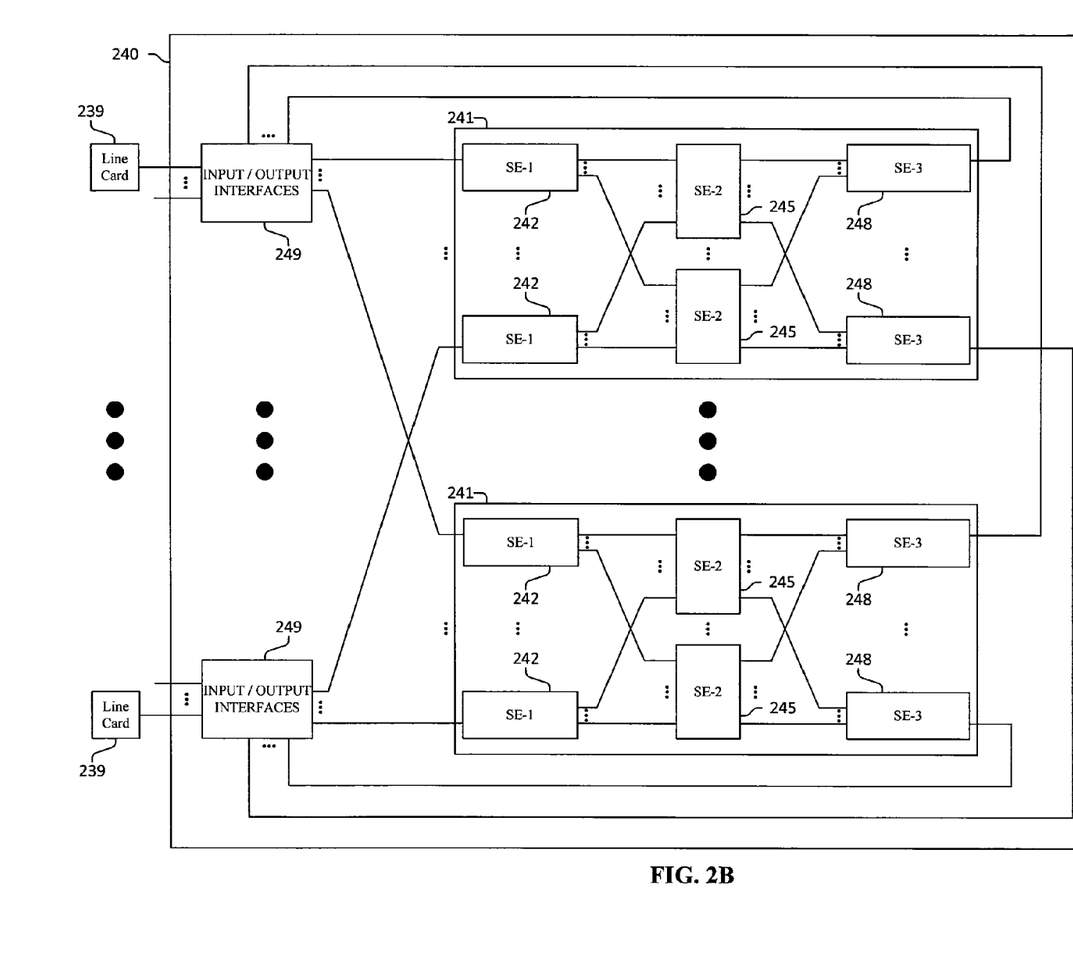
FIG. 2B illustrates a packet switching device according to one embodiment.
Figure 2C:
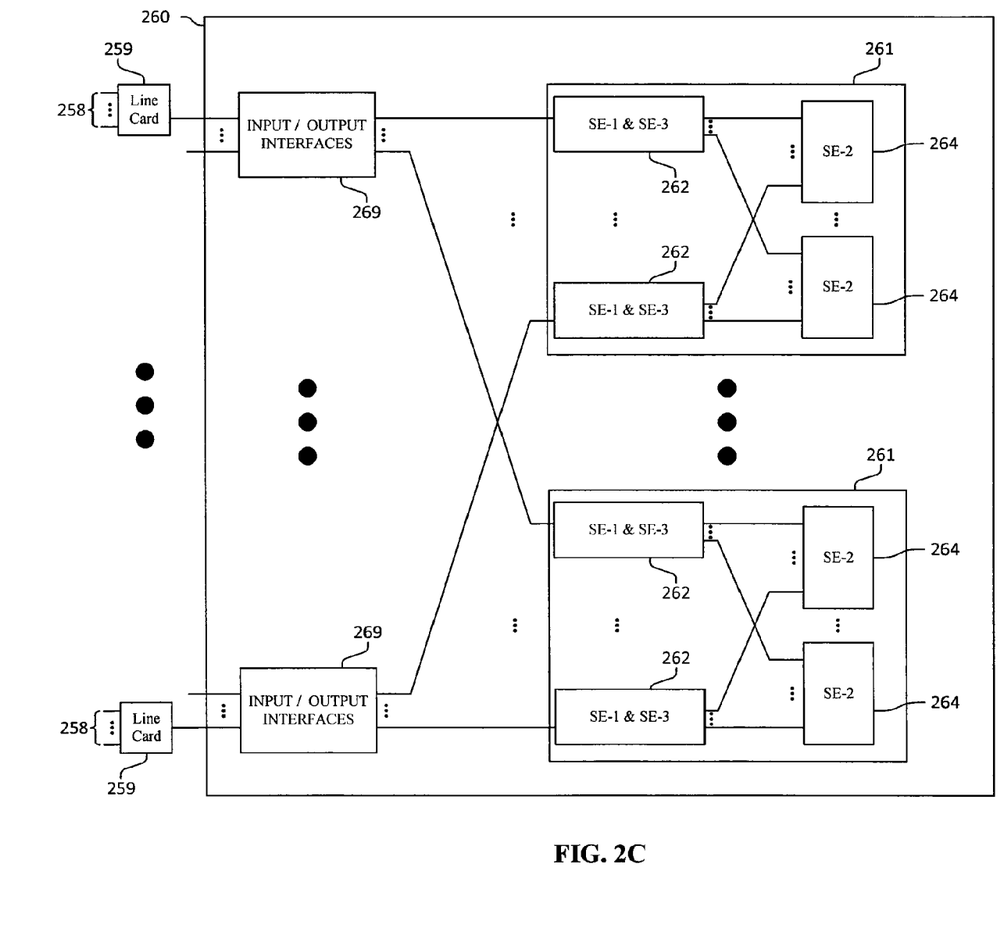
FIG. 2C illustrates a packet switching device according to one embodiment.

FIGS. 2A-C illustrate the basic topology of different exemplary packet switching systems. FIG. 2A illustrates an exemplary packet switch 200 having multiple inputs and outputs and a single interconnection network 210. FIG. 2B illustrates an exemplary packet switch 240 having multiple interconnection networks 241 and folded input and output interfaces 249. FIG. 2C illustrates an exemplary folded packet switch 260 having multiple interconnection networks 261 and folded input and output interfaces 269. Embodiments of each of these packet switches 200, 240 and 260 use a tie-breaking selection ordering of manipulated ingress point identifiers in determining which packets/cells to send before other packets/cells having a same timestamp. Of course, the invention is not limited to these illustrated operating environments and embodiments, and the packet switching systems may have more or less elements.

FIG. 2A illustrates an exemplary embodiment of a packet switch 200. Packet switch 200 comprises multiple input interfaces 205, interconnection network 210, and output interfaces 225. Input interfaces 205 and output interfaces 225 are both coupled over multiple links to interconnection network 210. Line cards 201 and 231 are coupled to input interfaces 205 and output interfaces 225. In certain embodiments including other packet switching topologies, line cards or their functionality may be included in the packet switch itself, or as part of the packet switching system.

In one embodiment, interconnection network 210 comprises multiple switch elements SE-1 212, SE-2 215, and SE-3 218 that are interconnected by multiple links. Line cards 201 and 231 may connect to other systems (not shown) to provide data items (e.g., packets) to be routed by packet switch 200. A tie-breaking selection ordering of manipulated ingress point identifiers in determining which packets/cells to send before other packets/cells having a same timestamp may be performed at one or more of the line cards 201, 231, input interfaces 205, switch elements SE-1 212, SE-2 215, and SE-3 218, output interfaces 225, and/or other locations within packet switch 200 or the packet switching system.

FIG. 2B illustrates another exemplary operating environment and embodiment of a packet switch 240. Packet switch 240 comprises multiple folded input and output interfaces 249 interconnected over multiple links to interconnection networks 241, which are interconnected over multiple links returning to input and output interfaces 249. In one embodiment, interconnection networks 241 comprise multiple switch elements SE-1 242, SE-2 245, and SE-3 248 also interconnected by multiple links. Interfaces 249 may connect via bi-directional links to line cards 239 that connect with other systems (not shown) to provide data items (e.g., packets) to be routed by packet switch 240. A tie-breaking selection ordering of manipulated ingress point identifiers in determining which packets/cells to send before other packets/cells having a same timestamp may be performed at one or more of the line cards 239, input and output interfaces 249, switch elements SE-1 242, SE-2 245, and SE-3 248, and/or other locations within packet switch 240 or the packet switching system.

FIG. 2C illustrates another exemplary operating environment and embodiment of a packet switch 260. Packet switch 260 has a folded network topology. Packet switch 260 comprises multiple folded input and output interfaces 269 interconnected over multiple links to interconnection networks 261, which are interconnected over multiple links returning to interfaces 269. In one embodiment, interconnection networks 261 comprise multiple switch elements SE-1 & SE-3 262 and SE-2 264 also interconnected by multiple links. Interfaces 269 may connect via bi-directional links to line cards 259 which connect via ports 258 to other systems (not shown) to provide data items to be routed by packet switch 260. A tie-breaking selection ordering of manipulated ingress point identifiers in determining which packets/cells to send before other packets/cells having a same timestamp may be performed at one or more of the line cards 259, input and output interfaces 269, switch elements SE-1 & SE-3 262 and SE-2 264, and/or other locations within packet switch 260 or the packet switching system.

Figure 3:
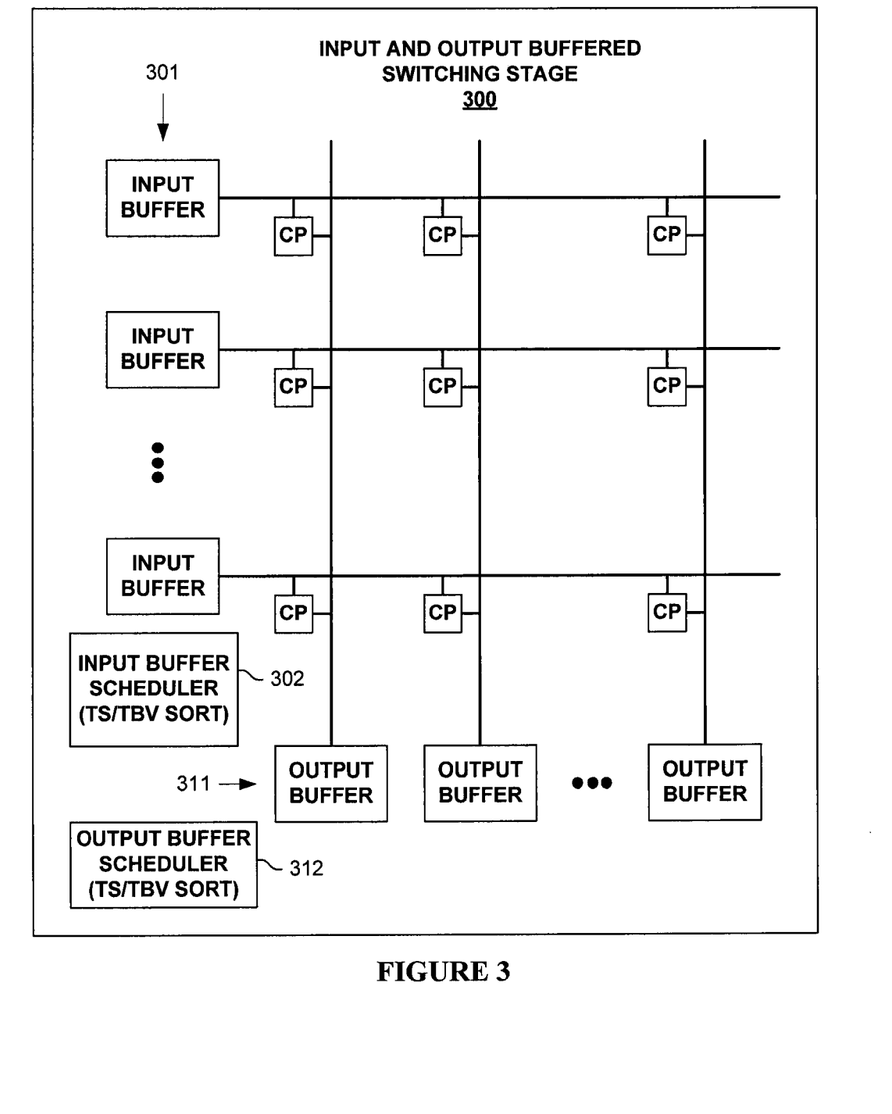
FIG. 3 illustrates a packet switching mechanism according to one embodiment.

FIG. 3 illustrates a packet switching mechanism according to one embodiment, and in particular, input and output buffered switching stage 300. In one embodiment, an input and output buffered switching stage 300 is used in switch elements within a packet switching device. In one embodiment, a switching mechanism other than input and output buffered switching stage 300 is used in switch elements within a packet switching device.

Input and output buffered switching stage 300 includes input buffers 301 and output buffers 311, which buffer cells. Input buffer scheduler 302 and output buffer scheduler 312 determine which cells to forward between input buffers 301 and output buffers 311 based on earliest timestamps (TS), and with tie-breaker values (TBVs) determined from manipulation of ingress point identifiers associated with said cells having a same timestamp. In one embodiment, input buffer scheduler 302 determines the cell forwarding in the horizontal paths shown in FIG. 3, while output buffer scheduler 312 determines the cell forwarding in the vertical paths shown in FIG. 3.

Figure 4A:
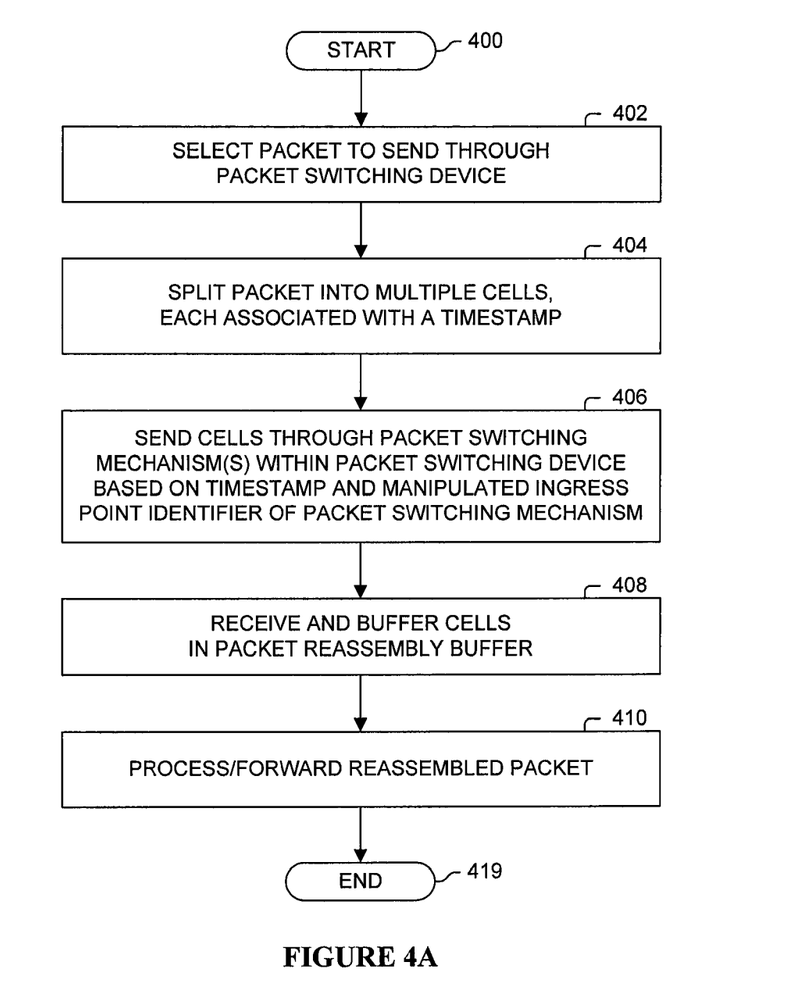
FIG. 4A illustrates processes according to one embodiment.

FIG. 4A illustrates a process performed in one embodiment. Processing begins with process block 400. In process block 402, a packet is selected to be sent through a packet switch. In process block 404, the selected packet is split into cells, with each cell associated with a timestamp (e.g., a global timestamp from a synchronized clock of the packet switching device). In process block 406, the cells are sent through the packet switching device, typically through multiple switching mechanisms (e.g., switching stages). At each switching mechanism, these cells are also associated with an ingress point identifier of the switching mechanism. The ordering of sending cells through the switching mechanism is based on the timestamp associated with the cell, and using a tie-breaker value of a manipulated ingress point identifier currently associated with the cell. Eventually, all the cells of a packet (if not dropped) are received in a reassembly buffer as illustrated by process block 408. In process block 410, the reassembled packet is processed/forwarded. Processing of the flow diagram of FIG. 4A is complete as illustrated by process block 419.

Using simply the ingress port of a switching mechanism as the tie-breaker typically results in bandwidth unfairness and/or latency unfairness. One embodiment manipulates the ingress point identifiers to vary the tie-breaking values among different timestamps. In one embodiment, the manipulation of ingress point identifiers is performed in a deterministic manner (e.g., calculation, which may include bit manipulation) such that for a value of a timestamp and a value of an ingress point identifier a deterministic tie-breaking value is a result. In one embodiment, this or another non-round robin ordering is used, where a round-robin ordering refers to simply selecting, for example, input port 1 to go first for a timestamp, then input port 2 (or another deterministic or random port selection) for a next timestamp, and so on.

In one embodiment, the varying of the tie-breaking values for an input port of a switching mechanism is bounded, such as to reduce jitter. For example, if there are sixteen ingress port identifiers, the tie-breaking order can vary from first to sixteenth. If the tie-breaking order greatly switches for each timestamp, then jitter is induced. One embodiment bounds the variance in position by one or two positions, one-fourth the number of ingress port identifiers, or one-half of the ingress port identifiers.

Figure 4B:
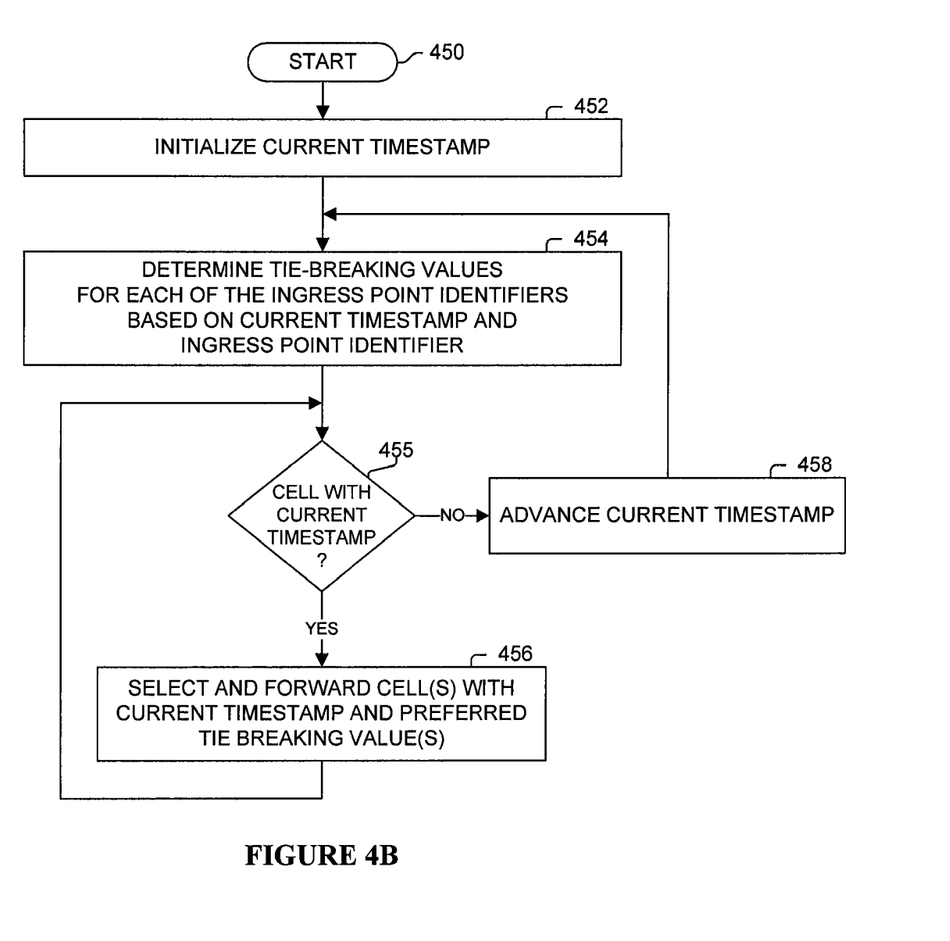
FIG. 4B illustrates processes according to one embodiment.

FIG. 4B illustrates a process performed in one embodiment, such as by a switching mechanism determining which cell to forward when cells associated with a same timestamp are to be sent from multiple ingress points of the switching mechanism. Processing begins with process block 450. In process block 452, the current timestamp (e.g., variable) is initialized (e.g., to the current global timestamp). In process block 454, tie-breaking values are determined for each of the ingress point identifiers (e.g., corresponding to ports zero to fifteen in a sixteen input switching mechanism) based on the current timestamp and the ingress port identifiers. In one embodiment, this operation is performed for all ingress point identifiers. In one embodiment, this operation is performed only for those ingress point identifiers which correspond to ingress ports having a cell with the current timestamp.

As determined in process block 455, as long as there remains a cell to be sent with the current timestamp at an ingress port, then processing proceeds to process block 456 to select and forward one or more cells with the current timestamp and preferred tie-breaking value(s) (e.g., which tie-breaking value is lowest or highest depending on the implementation). In one embodiment, multiple cells can be sent at a same time (e.g., when sending of one does not block the sending of another cell). Processing returns to process block 455.

As determined in process block 455, when there are no cells remaining to be forwarded through the switching mechanism with the current timestamp, then processing proceeds to process block 458 to advance the current timestamp to the next timestamp (e.g., next clock advancement, or lowest timestamp of a cell to be sent through the switching mechanism). Processing then returns to process block 454 to determine the tie-breaking values for the new current timestamp.

Figure 5:
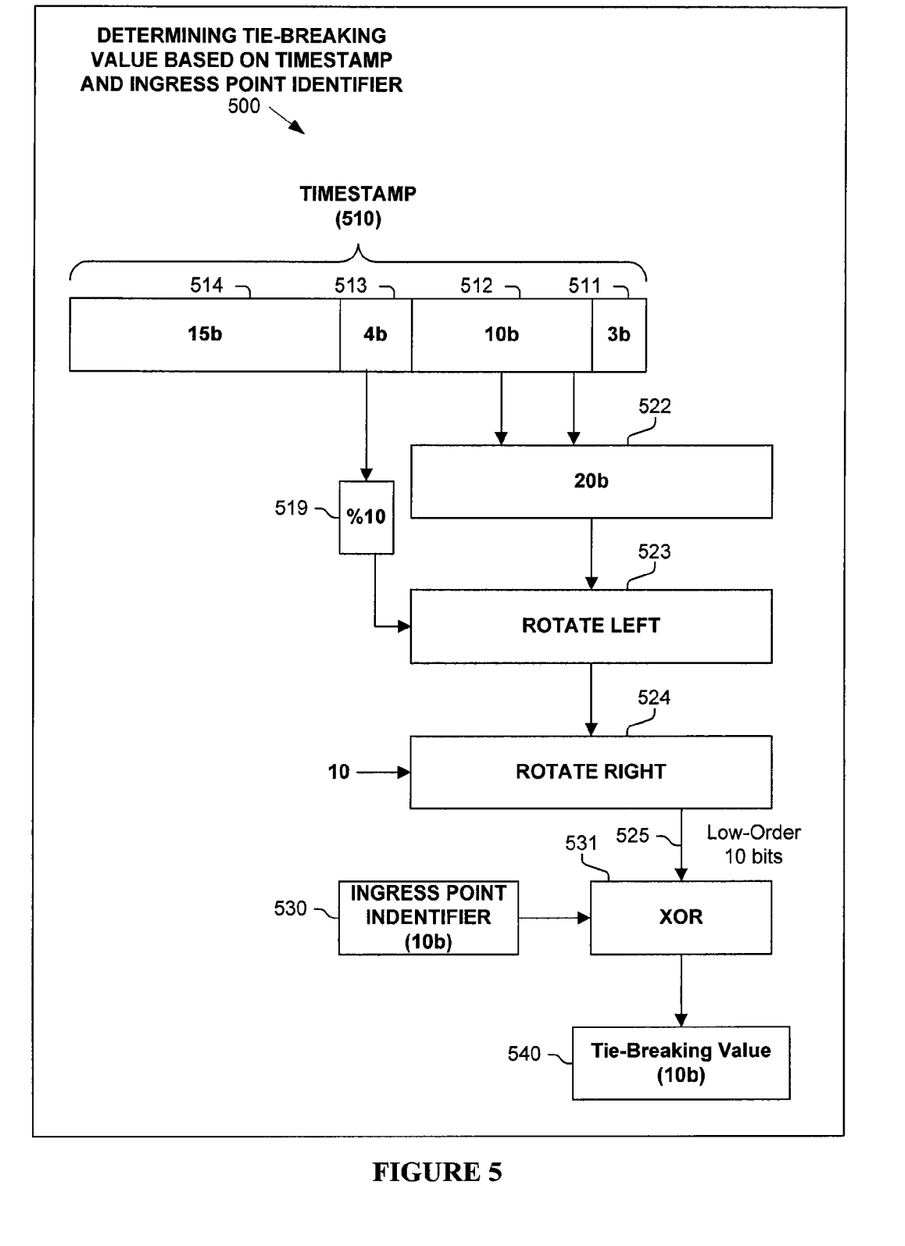
FIG. 5 illustrates processes according to one embodiment.

FIG. 5 illustrates a process performed in one embodiment to determine a tie-breaking value 540 based on a timestamp 510 and ingress point identifier 530 (e.g., currently associated with a cell to be sent through a switching mechanism).

As shown, timestamp 510 includes bit ranges 511-514 of varying number of bits (bit is identified as lower case 'b'). Two copies of bits 512 of timestamp 510 are concatenated (522), when are then rotated left (523) by the number of bit positions identified by the value bits 513 of timestamp 510 modulus ten (519) (e.g., remainder after an integer division of ten), then rotated right ten bit positions (524). An exclusive-OR operation (531) is then performed using the resultant low-order ten bits (525) of the rotate right operation (524) and the ten-bit ingress point identifier 530 resulting in tie-breaking value 540 deterministically determined/calculated based on timestamp 510 and ingress point identifier 530.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
sending a plurality of packets through a packet switching mechanism of a packet switching device, which includes partitioning each particular packet into a plurality of cells with each particular packet associated with a particular timestamp and a particular ingress point identifier representing an ingress point of a plurality of ingress points of the packet switching mechanism, and with each particular cell of the plurality of cells associated with the particular packet being associated with the particular timestamp and the particular ingress point identifier;
wherein said sending the plurality of packets includes sending said cells through the packet switching mechanism by selecting and forwarding, at each of a plurality of points within the packet switching mechanism, cells with an earlier timestamp before cells with a later timestamp, and determining a tie-breaking value for each of a same timestamp plurality of cells having a same timestamp and different ingress point identifiers and using said tie-breaking values to select the order to forward cells of the same timestamp plurality of cells, wherein said determining a tie-breaking value for each identifiable cell of the same timestamp plurality of cells is performed based on a manipulation of the ingress point identifier associated with said identifiable cell in a manner to vary the tie-breaking selection ordering of ingress point identifiers for different timestamp values, with the tie-breaking value being different than the ingress point identifier associated with said identifiable cell.

2. The method of claim 1, wherein the manipulation of ingress point identifiers to vary the tie-breaking selection ordering of ingress point identifiers for different timestamp values is performed in a deterministic manner such that for a value of a timestamp and a value of an ingress point identifier a deterministic tie-breaking value is a result.

3. The method of claim 2, comprising: independently calculating for each of the plurality of points within the packet switching mechanism, tie-breaking values for a plurality of cells having a same timestamp and different ingress point identifiers.

4. The method of claim 2, wherein said determining a tie-breaking value for each identifiable cell of a same timestamp plurality of cells having a same timestamp and different ingress point identifiers, includes bit manipulation of bits of both the same timestamp and ingress point identifier associated with said identifiable cell.

5. The method of claim 4, wherein said bit manipulation includes an X-OR operation on bits of the same timestamp with bits of the ingress point identifier associated with said identifiable cell.

6. The method of claim 5, wherein said bit manipulation includes a bit shifting operation on bits of the same timestamp.

7. The method of claim 1, wherein the manipulation of ingress point identifiers to vary the tie-breaking selection ordering of ingress point identifiers for different timestamp values is performed using a deterministic calculation such that for a value of a timestamp and a value of an ingress point identifier deterministic tie-breaking value is a result.

8. The method of claim 2, wherein said deterministic calculation includes bit manipulation of bits of both the same timestamp and ingress point identifier associated with said identifiable cell.

9. The method of claim 8, wherein said bit manipulation includes an X-OR operation on bits of the same timestamp with bits of the ingress point identifier associated with said identifiable cell.

10. The method of claim 9, wherein said bit manipulation includes a bit shifting operation on bits of the same timestamp.

11. The method of claim 1, wherein said vary the tie-breaking selection ordering of ingress point identifiers for different timestamp values is done in a non-round-robin ordering.

12. The method of claim 1, wherein the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to less than half of the number of ingress points in the plurality of ingress points away from its previous position in the overall ordering.

13. The method of claim 1, wherein the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to less than two positions away from its previous position in the overall ordering.

14. The method of claim 1, wherein the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to limit the amount of jitter induced by changing the tie-breaking selection ordering of ingress point identifiers for different timestamp values.

15. A packet switching device, comprising:
a plurality of interfaces configured to send and receive packets; and
a packet switching mechanism, including a plurality of cell-switched buffered stages, configured to packet switch packets among said interfaces;
wherein the packet switching device is configured to send a plurality of packets through the packet switching mechanism, which includes configuration to partition each particular packet into a plurality of cells with each particular packet associated with a particular timestamp and a particular ingress point identifier representing an ingress point of a plurality of ingress points of the packet switching mechanism, and with each particular cell of the plurality of cells associated with the particular packet being associated with the particular timestamp and the particular ingress point identifier;
wherein said configuration to send the plurality of packets includes configuration to send said cells through the packet switching mechanism by selecting and forwarding cells with an earlier timestamp before cells with a later timestamp, and determining a tie-breaking value for each of a same timestamp plurality of cells having a same timestamp and different ingress point identifiers and using said tie-breaking values to select the order to forward cells of the same timestamp plurality of cells, wherein said determining a tie-breaking value for each identifiable cell of the same timestamp plurality of cells is performed based on a manipulation of ingress point identifier associated with said identifiable cell in a manner to vary the tie-breaking selection ordering of ingress point identifiers for different timestamp values.

16. The packet switching device of claim 15, wherein the manipulation of ingress point identifiers to vary the tie-breaking selection ordering of ingress point identifiers for different timestamp values is performed in a deterministic manner such that for a value of a timestamp and a value of an ingress point identifier a deterministic tie-breaking value is a result.

17. The packet switching device of claim 16, comprising: independently calculating for each of the plurality of points within the packet switching mechanism, tie-breaking values for a plurality of cells having a same timestamp and different ingress point identifiers.

18. The packet switching device of claim 15, wherein the manipulation of ingress point identifiers to vary the tie-breaking selection ordering of ingress point identifiers for different timestamp values is performed using a deterministic calculation such that for a value of a timestamp and a value of an ingress point identifier a deterministic tie-breaking value is a result.

19. The packet switching device of claim 18, wherein said deterministic calculation includes bit manipulation of bits of both the same timestamp and ingress point identifier associated with said identifiable cell.

20. The packet switching device of claim 15, wherein the manipulation of ingress point identifiers to vary the tie-breaking selection ordering of ingress point identifiers for different timestamp values limits the change in an overall ordering position in an overall ordering for each ingress point identifier representing an ingress point of the plurality of ingress points to limit the amount of jitter induced by changing the tie-breaking selection ordering of ingress point identifiers for different timestamp values.

* * * * *